United States Patent

Reddick

[15] 3,707,607

[45] Dec. 26, 1972

[54] HANDS-FREE EMERGENCY CALL BOX

[72] Inventor: Willis C. Reddick, Corinth, Miss.

[73] Assignee: International Telephone and Telegraph Corporation, New York, N.Y.

[22] Filed: Aug. 10, 1970

[21] Appl. No.: 62,270

[52] U.S. Cl. ..............179/100 L, 179/1 HF, 179/179

[51] Int. Cl. ..............................................H04m 1/04

[58] Field of Search .........179/1 H, 1 HF, 5 R, 100 L, 179/178, 179, 183; 340/286, 287; D26/14 A

[56] References Cited

UNITED STATES PATENTS

| | | | |
|---|---|---|---|
| 1,181,947 | 5/1916 | Cadieux | 179/100 L |
| 2,087,027 | 7/1937 | Glaser | 179/1 H |
| 2,157,140 | 5/1939 | Molin et al. | 179/1 H |

FOREIGN PATENTS OR APPLICATIONS

| | | | |
|---|---|---|---|
| 1,132,378 | 10/1968 | Great Britain | 179/183 |

OTHER PUBLICATIONS

"Nurses' Signal Phone System," Holtzer–abot Electric Co., Publication, December 1930.

*Primary Examiner*—Kathleen H. Claffy
*Assistant Examiner*—Randall P. Myers
*Attorney*—C. Cornell Remsen, Jr., Walter J. Baum, Paul W. Hemminger, Charles L. Johnson, Jr., James B. Raden, Delbert P. Warner and Marvin M. Chaban

[57] ABSTRACT

An all weather emergency-reporting telephone call box and system is provided. The call box uses a speaker and microphone for voice reception and transmission, respectively. The housing is formed of heavy material in a configuration selected to minimize the opportunity for vandalism. Direct communications access to the emergency station can be gained by the operation of one push-button switch which operates equipment preparing the system for hands-free operation.

4 Claims, 21 Drawing Figures

SECTION G-G

Figure 1:
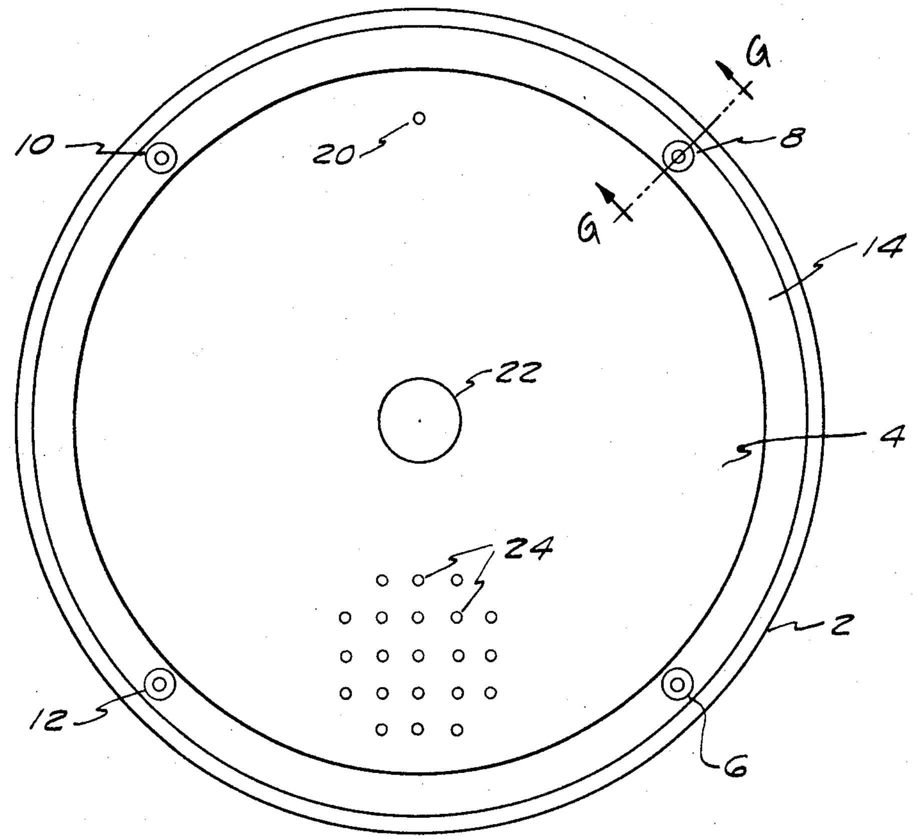

INVENTOR.
WILLIS C. REDDICK
BY Delbert A. Warner

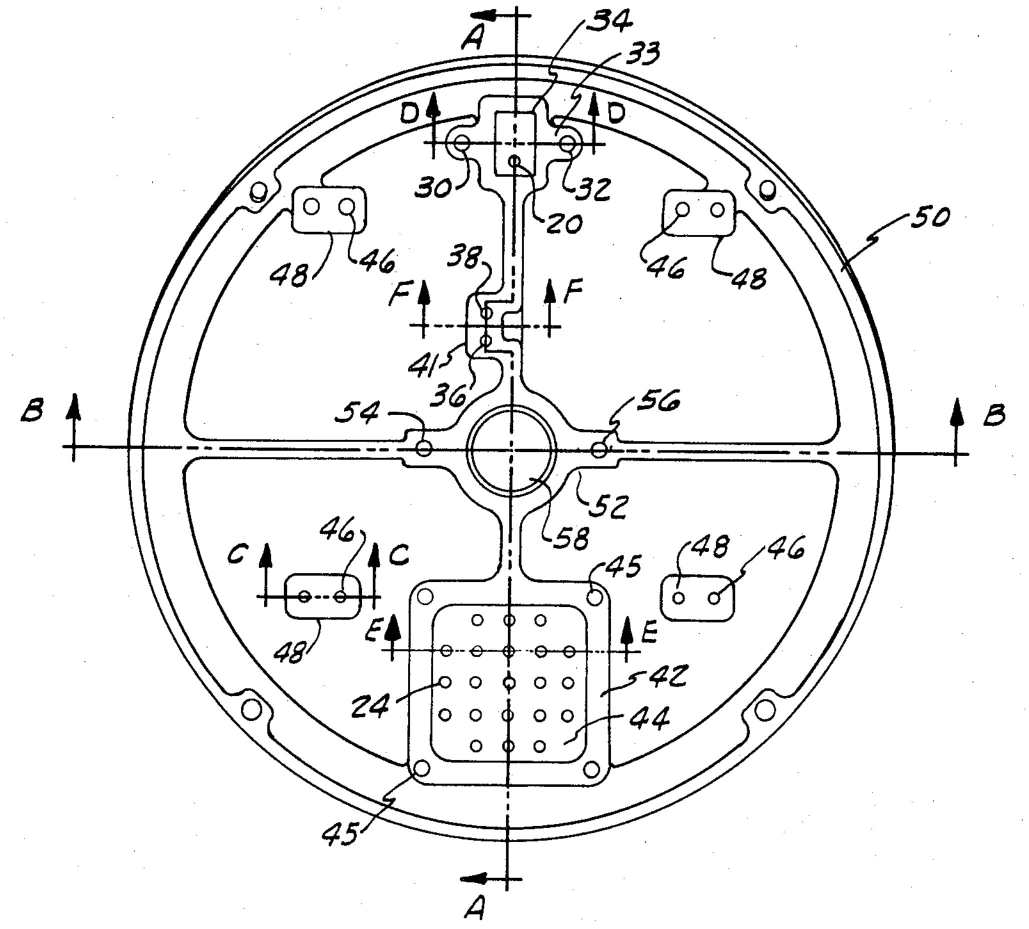
FIG. 3
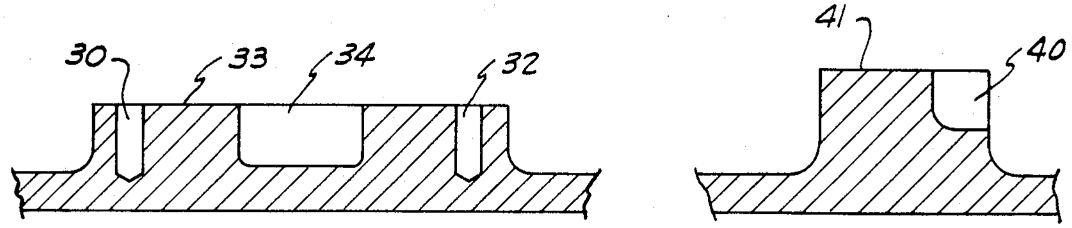
SECTION D-D
FIG. 3A
SECTION F-F
FIG. 3B

SECTION A-A

SECTION A-A

HANDS-FREE EMERGENCY CALL BOX

This invention relates to an emergency reporting telephone and particularly to an emergency telephone call box employing a speaker and microphone for voice communication where the speaker and the microphone are both prepared for operation when one button is pushed momentarily.

Emergency reporting and Police and Fire call-box telephones presently in use are operated with a handset and a hookswitch. Because the handset requires the use of an operator's hand, he is not free to use both hands to cope with pending emergencies. Therefore, an important object of the invention is to provide means to enable communications to be established and maintained without physical contact with the apparatus beyond that required to start the apparatus.

Furthermore, handsets are subject to various forms of vandalism. Most notably, their line cords can be cut and the handsets stolen. Handsets are often left off-hook which keeps the circuit, serviced by the telephone, in constant operation and thus reduces circuit utilization by the receiving station. Hence, another important object of the invention is to provide reduced susceptibility to vandalism.

The disadvantages referred to are overcome and the objects are attained by providing a housing and attendent components in accordance with the present invention. Embodiments of the invention include a metal housing which is designed to reduce vandalism. A voice switched amplification system is located within the housing to provide hands-free operation. The speaker and microphone, as a part of this system, are placed behind double walls with off-set holes. These off-set holes prevent access by probing tools from the outside of the housing while providing an acoustical air path to the transducers. A push-button switch to activate the system is mounted within the housing and has its bearing surface mounted flush with the housing to protect it from attack by vandals. The metal housing is formed of heavy metal in a protective design so that in combination with the hidden speaker and microphone and the protected push-button the system presents a reduced susceptibility to vandalism and other misuse.

Operation of the set is initiated by depressing the push-button, which is placed in an easily accessible location on the housing. Momentary activation of the push-button latches a relay associated with the invention which maintains electrical connection with the receiving station until a release is initiated by the receiving station. This combination insures that no other physical action is required beyond one depression of the button. Speech is all that is required further from the user, and he is free to use his hands for other purposes. No handset is available to steal, vandalize or leave off-hook.

Figure 2:
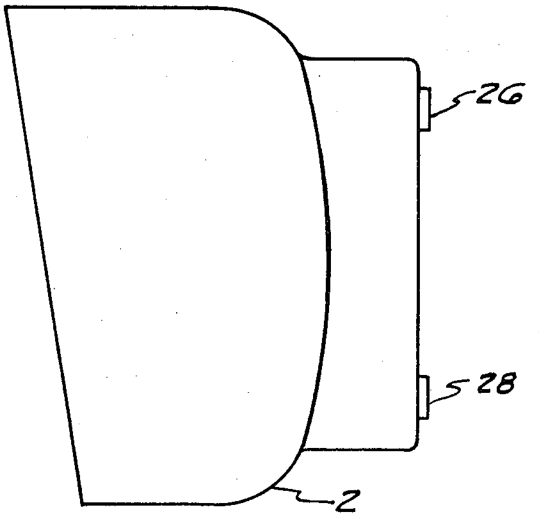
Figures 3C, 3D, 3E, 3F:
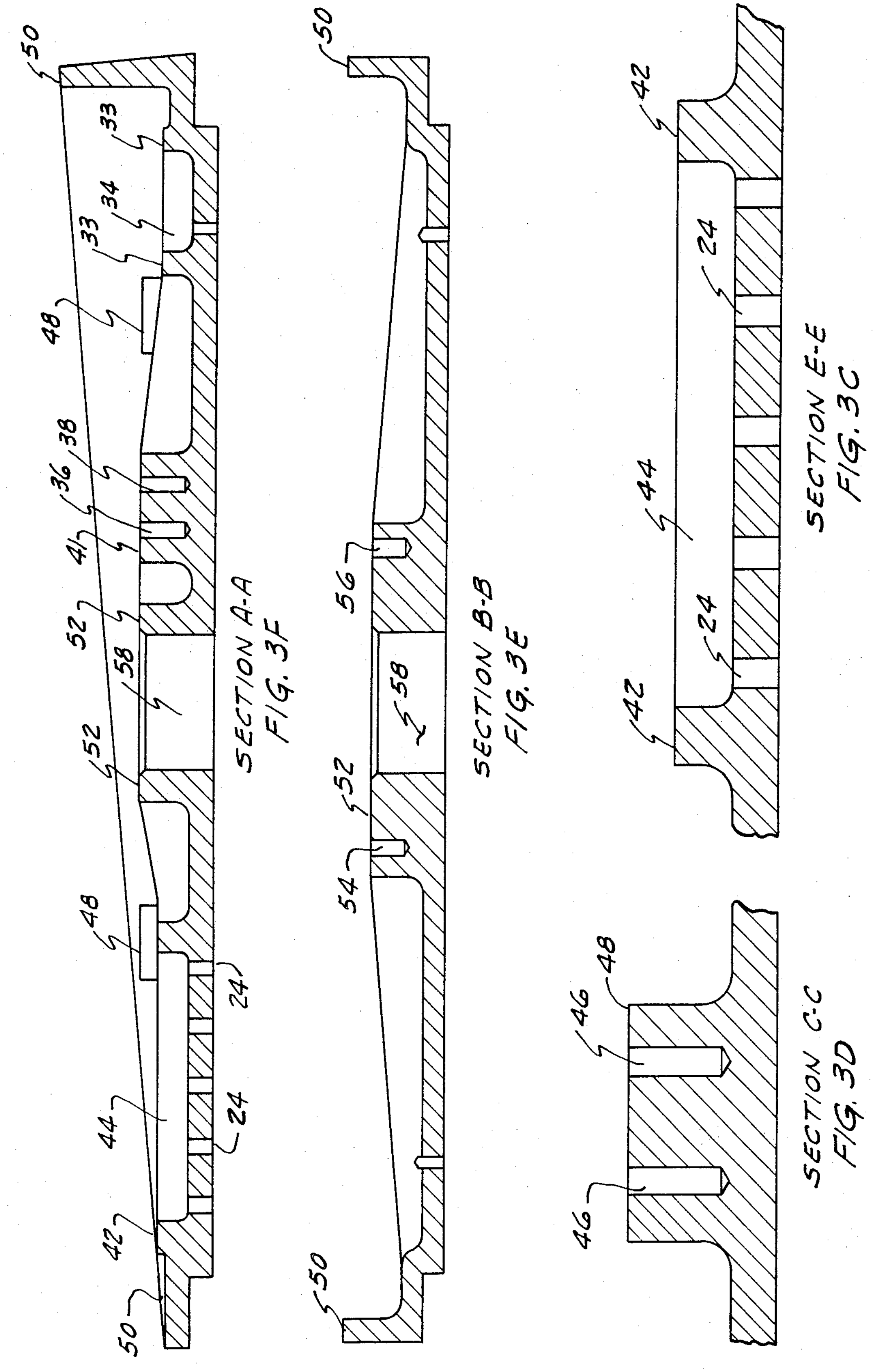
Figure 4:
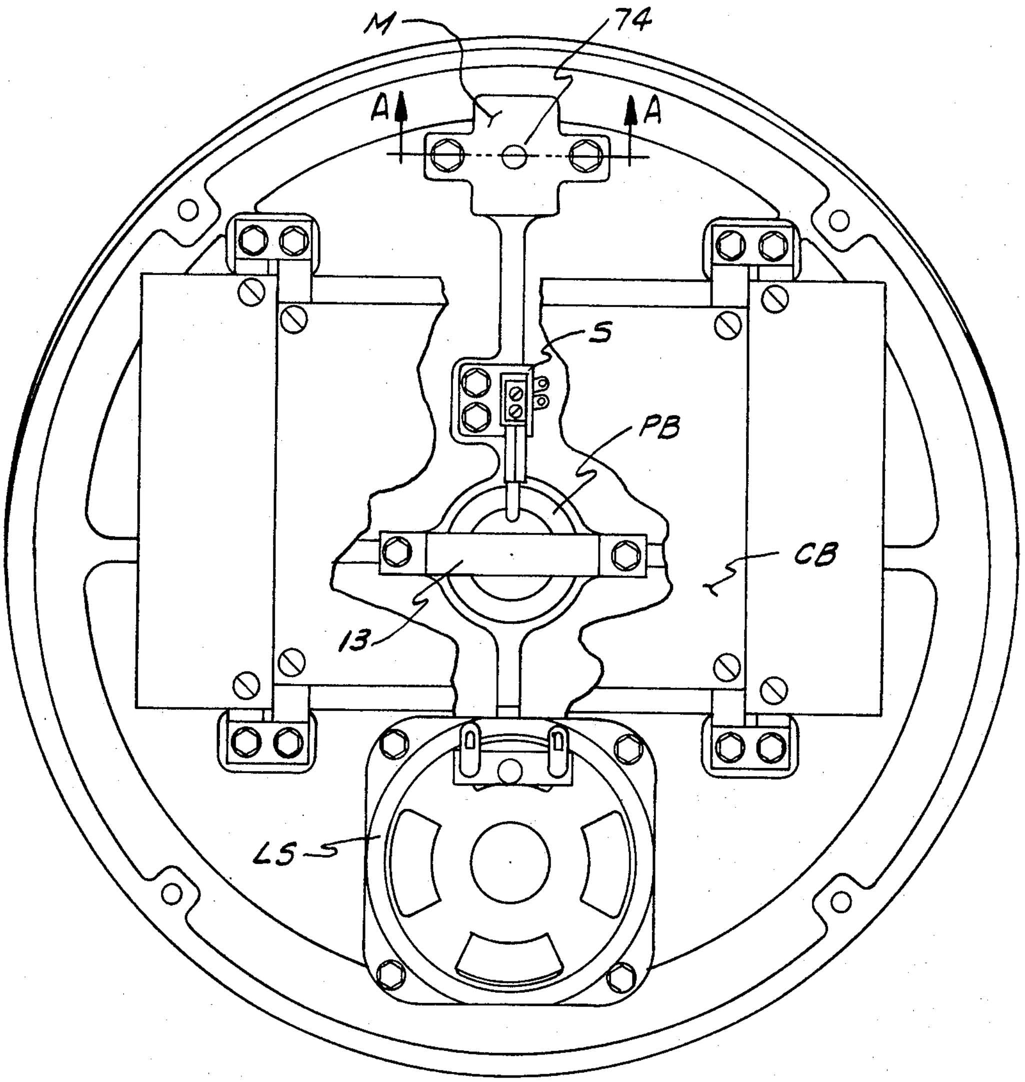
Figure 4A:
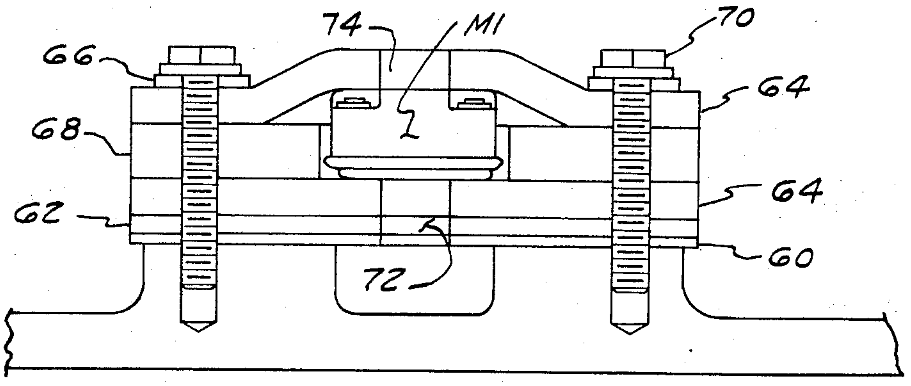
Figure 4B:
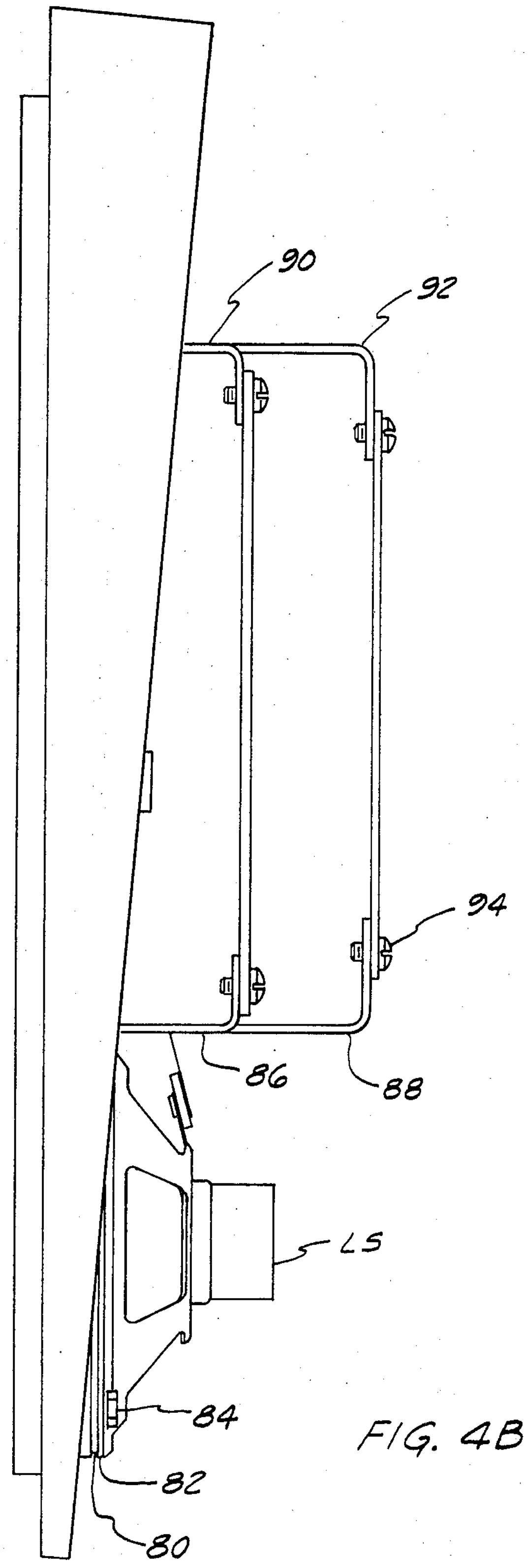
Figure 5A:
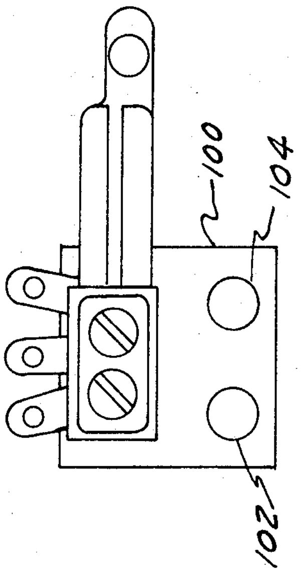
Figure 5B:
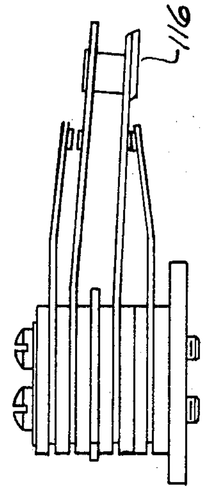
Figure 6A:
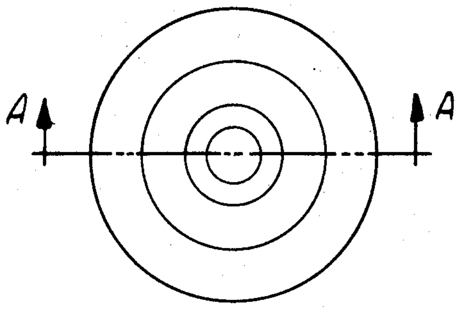
Figure 6B:
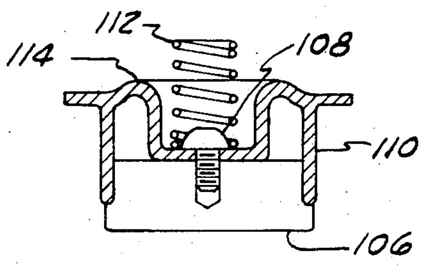
Figure 4C:
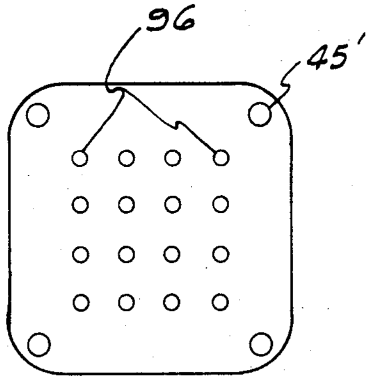
Figure 7B:
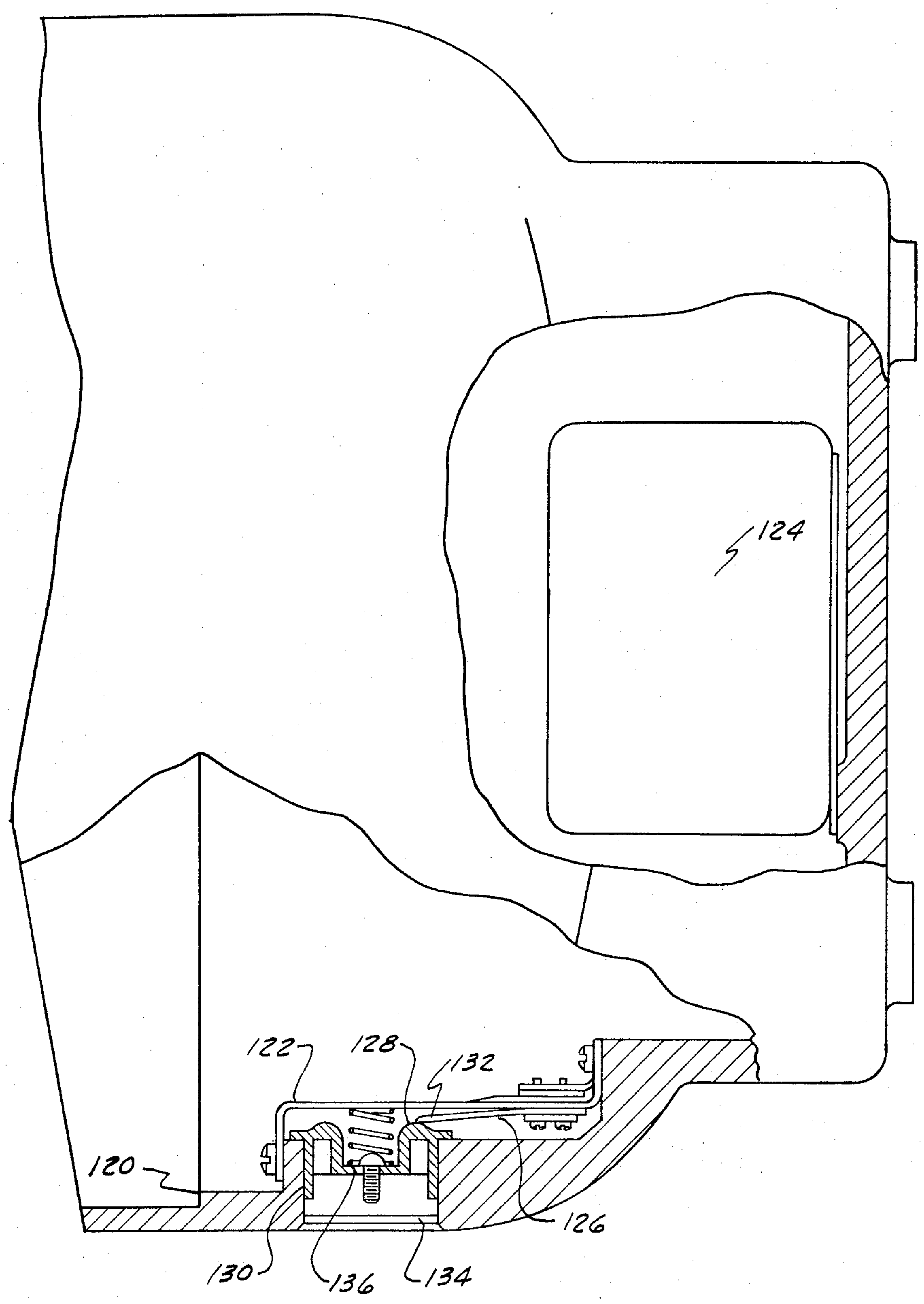
Figure 7A:
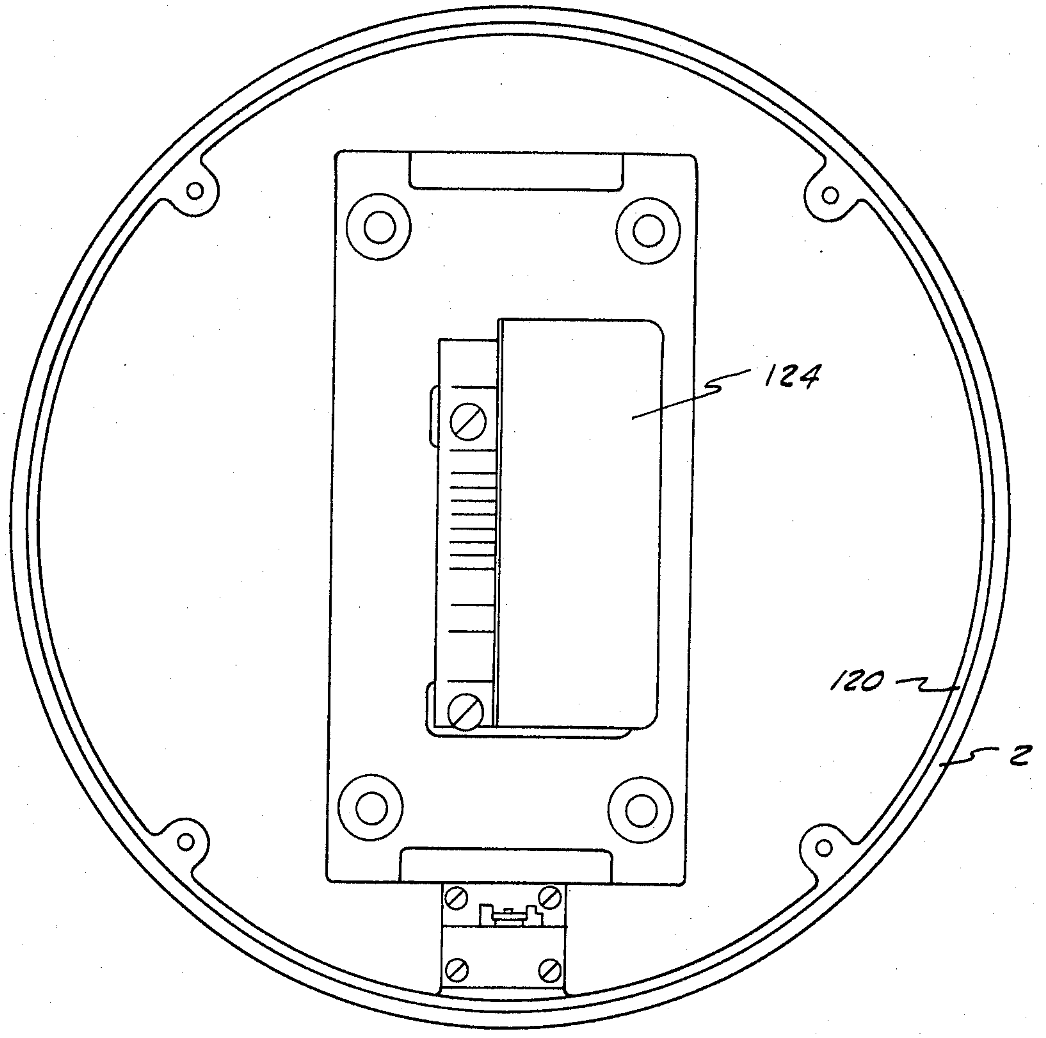
Figure 8:
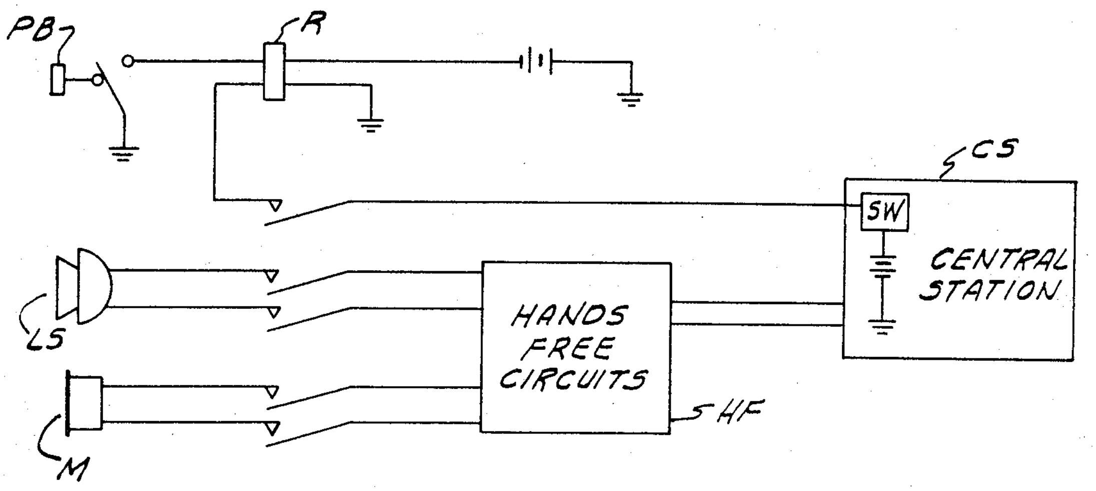

The above mentioned and other features and objects of this invention and the manner of obtaining them will become more apparent, and the invention itself will be best understood by reference to the following description of an embodiment of the invention taken in conjunction with the accompanying drawings, in which:

FIG. 1 is a plan view showing the obverse side of the faceplate and a front view of a housing according to the invention. This view includes the arrangement of speaker openings, microphone openings and a push-button in an exemplary embodiment, FIG. 2 is a side view of FIG. 1 showing a view of the exterior of the protective housing, FIG. 3 is a view of the reverse side of the faceplate showing support structures, FIGS. 3A - 3F present sectional views of various structures in FIG. 3, FIG. 4 is a view of the reverse side of the faceplate showing components mounted thereon, FIG. 4A is a sectional view of the microphone assembly from FIG. 4, FIG. 4B is a side view of FIG. 4, FIG. 4C is a view of a speaker plate assembly, FIGS. 5A and 5B illustrate a switch assembly for use with the invention, FIGS. 6A and 6B illustrate a push button assembly, FIGS. 7A and 7B illustrate a housing, push button and switch assembly, FIG. 8 shows exemplary electrical circuits of use in the practice of the invention.

Figure 1A:
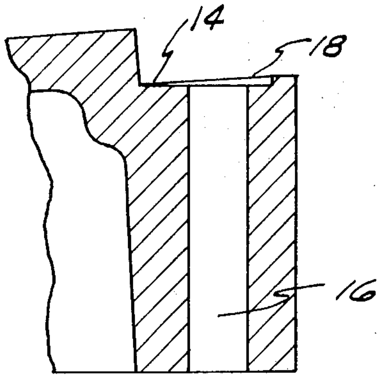

Turn now to the figures for a detailed showing of an embodiment of the invention. FIG. 1 depicts a front view of a call box and shows the front edge of the housing 2 with a face plate 4 secured thereto by fasteners at 6, 8, 10 and 12. These fasteners preferably are tamper-proof button head screws for security. The outer rim 14 of the face plate is recessed, as shown on an enlarged scale in FIG. 1A of the section G—G from FIG. 1. This recess provides additional security against tampering between the rim and the edge of housing 2. As shown in FIG. 1A a hole is drilled at 16 and the surface is spot-faced at 18.

The face plate 4 of FIG. 1 includes an opening at 20 which provides an air channel to a microphone mounted behind the face plate. A circle 22 near the center of the face plate represents an opening to accept the head of a push button through which the initial telephone connection may be established from the station to a central emergency office. A plurality of openings at 24 represent air passages through which sound from a hidden speaker will emanate.

The positions of the openings 20, 22 and 24, shown in FIG. 1, have been selected to minimize the effects of moisture by draining the respective cavities to which they are connected inside the housing. The speaker is coated with mylar and other components are selected to be unaffected by vibrations and by predictable variations in temperature, humidity and the like.

FIG. 2 further illustrates the housing assembly 2 which, in a preferred embodiment, is of integral construction for greater strength and for reduced risk of damage from tampering by vandals. The edge of the housing is shown in a characteristic position having a slanted surface facing downward to reduce the effects which would be produced by rain, snow and dirt on a vertical surface or on a slanted surface facing upward or sideward. Extensions such as 26 and 28 may be employed in fastening the housing to a suitable support.

FIG. 3 shows the reverse side of the face plate of FIG. 1. Here and in related FIGS. 3A - 3F are shown specific details of supports used in a preferred embodiment of the invention. Also, the positions of the holes 20, 22 and 24 are established relative to the supports. It will be recalled that through these holes the microphone and the loudspeaker are acoustically coupled and the push button is operated.

FIG. 3A is a sectional view along the line D—D in FIG. 3 showing details of supports for the microphone. In this case, holes at 30 and 32 in a mount 33 are used to accept screws to hold the microphone in place. The opening at 34 is a receptacle to contain the microphone. To reduce the hazards of vandalism, the hole 20 is offset, as shown in FIG. 3, from the center of the opening 34 so that thin objects thrust through hole 20 will not directly strike vulnerable parts of the microphone.

FIG. 3B is a sectional view along section line F—F of FIG. 3 showing a portion of the face plate used to support a switch assembly. The switch supported by this assembly is controlled by operation of the push button assembly discussed below. The switch assembly is held in place relative to the opening 40 and the mount 41 by screws in the holes 36 and 38 (FIG. 3).

FIG. 3C is a sectional view along line E—E of FIG. 3 showing details of the arrangement of the support for the loudspeaker and also further details of the opening 24 for acoustical coupling of the loudspeaker. In addition, it shows portions of a support 42 around an opening 44. The opening 44 is shown in FIG. 3 to be formed by a single body 42 which is integral with the face plate. In FIG. 3 also are shown openings 45 to receive mounting screws for the loudspeaker assembly.

FIG. 3D is a sectional view along line C—C of FIG. 3 showing a mount 48 for supporting brackets or printed circuit boards and the like. Suitable mounting holes are indicated at 46 and corresponding places on FIG. 3.

FIG. 3E is a sectional view B—B taken horizontally through the center of the embodiment of the invention according to FIG. 3. In this view, the edge 50 of the face plate is clearly shown as is the mount 52 for the push button assembly. Holes to mount the push-button assembly are shown at 54, 56 and 58 where 54 and 56 are screw holes and 58 provides a space through which the push button may be mounted.

FIG. 3F is a sectional view A—A taken vertically through the center of the representation of FIG. 3. In this view, a profile is shown of various mounts, holes and openings in the face plate to more clearly establish their relationships.

FIG. 4. illustrates the assembly of a plurality of components in accordance with certain aspects of the invention. These components are fastened, in this example, to the reverse side of the face plate 4, to fixtures shown in FIG. 3. Among the more important of these elements are the microphone assembly M, the switch assembly S, the push button assembly PB, the circuit board assembly CB and the loudspeaker LS. Each of these components is fastened to one or more of the fasteners shown in FIG. 3 and FIGS. 3A – 3F by screws, as indicated.

FIG. 4A is a sectional view of the microphone assembly taken along the lines A—A in FIG. 4. In this view, a microphone M, a vibration insulator 60, a microphone plate 62, gaskets 64, washers 66, and a microphone locator 68 are fastened to the face plate by hexagonal washer head screws at 70.

It will be noticed, if suitable comparisons are made in FIGS. 3 and 4, that the center of the openings 72, 74 connecting acoustically into the microphone M are offset from the center of the acoustical opening 20 in the face plate (FIG. 3). This offset has been selected to provide a measure of protection to the microphone from direct probing with sharp instruments through the opening 20.

FIG. 4B is a side view of FIG. 4 illustrating additional relationships between the face plate 4 and the components supported by the plate. In this view, a speaker plate at 80, a moisture shield at 82 and the loudspeaker LS are supported and held on the reverse side of the face plate by hexagonal washer head screws 84. Similarly, printed circuit boards CB are supported by brackets 86, 88, 90, 92 on the face plate by suitable binding head machine screws 94.

An example of a preferred speaker plate corresponding to 80 in FIG. 4B is shown in FIG. 4C. Alignment of the holes 45 of FIG. 4C with the holes 45 of FIG. 3 and comparison of the openings 96 in 80 as shown in FIG. 4C with the openings 24 in the face plate as illustrated in FIG. 3 will reveal that the openings 24 and 96 are offset from each other. This offset is provided so that probes thrust through the opening 24 will be less likely to go through the openings 96 and harm the loudspeaker LS.

FIGS. 5A and 5B illustrate top and side views respectively of a switch assembly which may be used for the switch S in FIG. 4. This switch assembly has make and break contacts, as shown, but a switch having only make contacts may be used in a preferred embodiment. The switch plate 100 may be attached by suitable screws through openings 102 and 104 into the openings 36 and 38 in the mount 41, shown in FIG. 3.

FIG. 6A illustrates a top view of a push button assembly. FIG. 6B is a sectional view along the line A—A of FIG. 6A. As indicated in FIG. 6B, a button at 106 is fastened by a drive rivet 108 to a button guide 110. A compression spring at 112 will press against a bracket (113 in FIG. 4) to bias the push button assembly to a final position. The button guide 110, through its edge 114, will impinge against the contact spring assembly along surface 116 when the spring is depressed to close the make contact and open the break contact of FIG. 5B. Operation of the push button and switch assembly in this manner will enable circuits to operate to establish a connection between handsfree circuits in the call box and a central office.

FIGS. 7A and 7B illustrate additional aspects of the invention as they relate to the call box. In particular, FIG. 7A shows an interior view of the call box housing 2. In this view, a recess is shown which terminates in a flange at 120 against which the back edge of the face plate 4 (FIG. 1) will rest. A bracket 122 is shown as well as the top of a box 124. The box 124 typically will contain automatic dialing equipment to enable the system to connect through a conventional dial switch board.

FIG. 7B is in partial section to better show the interior arrangement of the housing 2. In this illustration the flange 120 is shown from the side as in the box 124. The bracket 122 supports a switch assembly at 126 including suitable contacts (not shown) which in a preferred example are make contacts which are operated when the shoulder 128 of a button guide 130 pushes against the extension 132 of the switch assembly. The arrangement of the button 134, the button guide 130 and the spring 136 corresponds to that of a similar push button assembly shown in FIG. 6B. The push button and switch assembly of FIG. 7B is provided to supply an alternate route to that supplied by the principal button 106 of FIG. 6B.

The operation of circuits according to the present invention is controlled by the push button. Once the button has been pressed a relay or an electronic circuit will be placed in a latched condition and connections will be completed through a pre-connected telephone channel to a central office. Conversations are transmitted and received over the respective microphone and loudspeaker through operation of hands-free circuits of the kind disclosed in the copending U.S. Pat. application Ser. No. 826,843 of George Galyas entitled "Comparison Circuit for Alternating Voltages" which was filed on Oct. 1, 1969. When the conversations are over, disconnection is dependent upon the actions of the party at the central office. In the usual construction, the caller at the call box will be able to establish the communication over the sole control but will not be able to terminate the electrical connections. In the event a second control is supplied to the call box, the caller will be able to select from two circuits. The feature of automatic dialing, where installed, will enable the call box to establish connections through normal telephone circuits.

FIG. 8 is a block diagram representing electrical and electronic circuits which may be used in operating a call box in accordance with the foregoing discussion. The symbols PB, LS and M represent a push button, loudspeaker and microphone, respectively, in accordance with the designations in FIG. 4.

To operate the circuit of FIG. 8, the caller pushes the button PB. Momentary contact of the push button contacts will close a circuit to ground, operating the relay R and establishing a latching circuit through a second winding of R to the central station CS. At this time, conversation may be conducted over the loudspeaker LS and the microphone M, via the hands-free circuits HF, with the central station CS. The circuits will remain operational until such time as the party at the central station releases the hold circuit through the relay R by opening a switch SW. A second push button and connections may be located at the call box as indicated in FIGS. 7A and 7B to enable a connection to a separate central station. A suitable automatic dialer may be interposed between the handsfree circuits and a dial exchange to enable connections to a central station over conventional telephone circuits.

While the principles of the invention have been described above in connection with specific apparatus and applications, it is to be understood that this description is made only by way of example and not as a limitation on the scope of the invention.

I claim:

1. A hands-free emergency call box and circuit comprising:

a housing for communication circuits, a face plate fastened securely to said housing, said face plate and housing providing an internal mounting space, means supporting electronic circuits within said internal mounting space, means providing support for a microphone, a push button assembly and a loudspeaker within the housing, switching means responsive to operation of said push button to complete electrical connections between said microphone, said loudspeaker, and said electronic circuits, an opening in said face plate to permit acoustical coupling into the microphone, a microphone mount for supporting the microphone, means fastening said microphone mount to said face plate in a position providing an offset between an axis through said opening and an axis perpendicular through the center of the face of said microphone, said offset affording protection against inclement weather conditions and against vandalism to said microphone, a plurality of openings grouped around a common center in said face plate to permit acoustical coupling from the loudspeaker, means mounting said loudspeaker behind said openings in a position offset from the common center to afford protection from the weather and from direct attack against the microphone by vandals, and an opening in said face plate into which the top of the push button assembly extends to a position flush with the face plate permitting its operation by hand while affording protection from damage.

2. A call box and circuit as claimed in claim 1, in which a latching circuit is supplied, and the push button responds to momentary pressure to establish connections through said latching circuit for handsfree operation of said loudspeaker and said microphone.

3. A call box and circuit as claimed in claim 2, in which means for releasing the connections through the latching circuit is located remotely under control of a central operator.

4. A call box as claimed in claim 1, in which a switch assembly is mounted behind said face plate at a distance from the push button assembly, linkage means is provided between the push button assembly and the switch assembly, and said linkage means includes means for operating the switch assembly in response to operation of said push button assembly.

* * * * *